United States Patent [19]
Loce et al.

[11] Patent Number: 5,387,985
[45] Date of Patent: Feb. 7, 1995

[54] NON-INTEGER IMAGE RESOLUTION CONVERSION USING STATISTICALLY GENERATED LOOK-UP TABLES

[75] Inventors: Robert P. Loce; Michael S. Cianciosi, both of Rochester; R. Victor Klassen, Webster, all of N.Y.

[73] Assignee: Xerox Corporation, Stamford, Conn.

[21] Appl. No.: 170,082

[22] Filed: Dec. 17, 1993

[51] Int. Cl.$^6$ ............................................. G03F 3/08
[52] U.S. Cl. .................................... 358/447; 358/404; 358/451; 358/455
[58] Field of Search ............... 358/166, 280, 298, 404, 358/451, 455, 447, 409, 410, 412

[56] References Cited

U.S. PATENT DOCUMENTS

| | | | |
|---|---|---|---|
| 4,437,122 | 3/1984 | Walsh et al. | 358/166 |
| 4,460,909 | 7/1984 | Bassetti | 346/160 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,814,890 | 3/1989 | Kato | 358/280 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,029,108 | 7/1991 | Lung | 364/519 |
| 5,134,495 | 7/1992 | Frazier et al. | 358/298 |
| 5,138,339 | 8/1992 | Curry et al. | 346/108 |
| 5,142,374 | 8/1992 | Tajika et al. | 358/298 |
| 5,150,311 | 9/1992 | Long et al. | 395/108 |
| 5,161,035 | 11/1992 | Muramatsu | 358/451 |
| 5,193,008 | 3/1993 | Frazier et al. | 358/298 |
| 5,206,741 | 4/1993 | Shimura et al. | 358/404 |
| 5,265,176 | 11/1993 | Miller | 382/47 |

FOREIGN PATENT DOCUMENTS 0177640 4/1986 European Pat. Off. ..... G06F 15/16

OTHER PUBLICATIONS

James C. Stoffel et al. *A Survey of Electronic Techniques for Pictorial Image Reproduction*, IEEE Transactions on Communications, vol. COM-29, No. 12, Dec. 1981.

L. Steidel *Technology Overview: Resolution Enhancement Technologies for Laser Printers*, LaserMaster Corp.

Robert P. Loce et al. *Facilitation of Optimal Binary Morphological Filter Design via Structuring Element Libraries and Design Constraints*, Optical Engineering, vol. 31, No. 5, May 1992, pp. 1008-1025.

Edward R. Dougherty ed., Marcel Dekker 1992, *Mathematical Morphology in Image Processing*, pp. 43-90.

Robert P. Loce et al., *Optimal Morphological Restoration: The Morphological Filter Mean-Absolute-Error Theorem*, Journal of Visual Communications and Image Representation, (Academic Press), vol. 3, No. 4, DEc. 1992, pp. 412-432.

Edward R. Dougherty et al., *Optimal Mean-absolute-error hit-or-miss filters: morphological representation and estimation of the binary conditional expectation*, Optical Engineering, vol. 32, No. 4, Apr. 1993, pp. 815-827.

Donald L. Ort *Character Edge Smoothing For Matrix Printing*, Xerox Disclosure Journal, vol. 6, No. 1, Jan.-/Feb. 1981, p. 19.

XDJ, vol. 5, No. 1, Jan./Feb. 1980, pp. 115-116.

Torrey Pines Research, *Behind Hewlett-Packard's Patent on Resolution Enhancement Technology*, (Becky Colgan ed., BIS CAP Int'l, 1990) pp. 1-60.

DP-Tek, Inc., *Trueres Resolution Transformation Technology*, 6 pages, May 27, 1993.

Adam L. Carley, PhD., *Resolution Enhancement in Laser Printers*, XLI Corp. Woburn, Mass., 1993, pp. 1-16.

Optical Engineering May 1992 by Robert P. Loce.

*Primary Examiner*—Edward L. Coles, Sr.
*Assistant Examiner*—John Ning

[57] ABSTRACT

The present invention is a method and apparatus for converting the resolution of bitmap images, and more specifically, to the use of a template matching process to alter the resolution of digital images for printing or similar methods of rendition. The present invention uses statistically generated templates, implemented using look-up tables, to improve document appearance upon output by converting from an original or input spatial resolution to an output spatial resolution that is device dependent, and where there is a non-integer relationship between the input and output resolutions. The resulting image signals may then be utilized to control a scanning beam where the beam varies in intensity and duration according to the pulses used to control it.

27 Claims, 14 Drawing Sheets

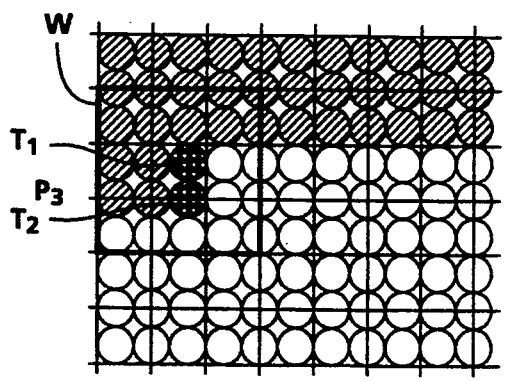
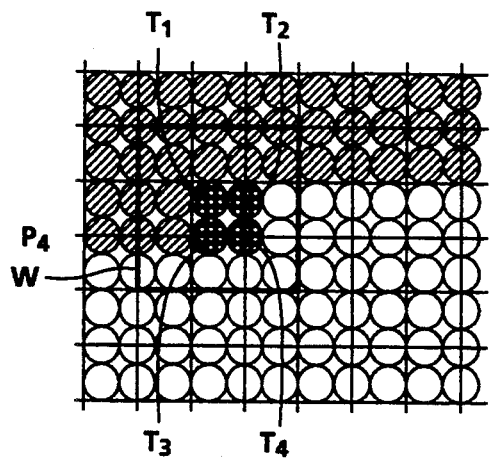
FIG. 11A  FIG. 11B
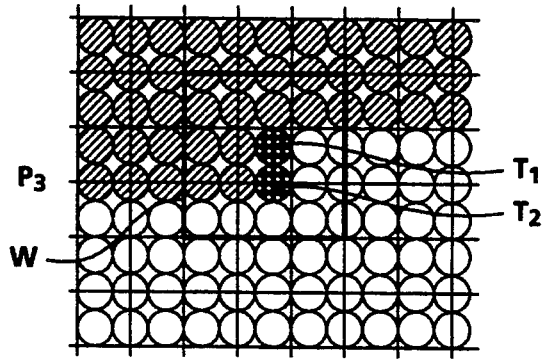
FIG. 11C
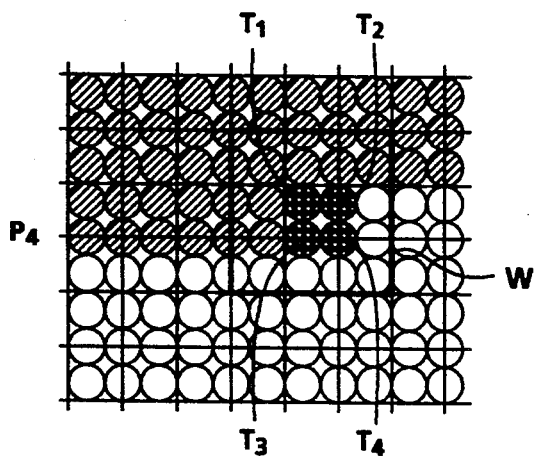
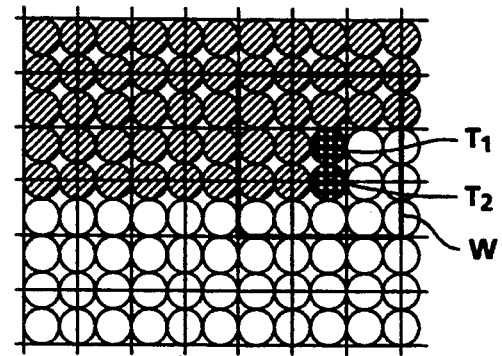
FIG. 11D  FIG. 11E

NON-INTEGER IMAGE RESOLUTION CONVERSION USING STATISTICALLY GENERATED LOOK-UP TABLES

This invention relates generally to a method and apparatus for improving the appearance of printed documents, and more particularly to the use of a template matching process to convert the resolution of digital images from an original or input resolution to an output resolution suitable for printing, where there is a non-integer relationship between the input and output resolutions.

CROSS REFERENCE

The following related applications are hereby incorporated by reference for their teachings:

"Method for Design and Implementation of an Image Resolution Enhancement System that Employs Statistically Generated Look-Up Tables," Loce et al., Ser. No. 08/169,485, filed concurrently herewith;

"Method for Statistical Generation of Density Preserving Templates for Print Enhancement," Loce, Ser. No. 08/169,565, filed concurrently herewith;

"Image Resolution Conversion Method that Employs Statistically Generated Multiple Morphological Filters," Loce et al., Ser. No. 08/169,487, filed concurrently herewith; and "Automated Template Design for Print Enhancement," Eschbach, Ser. No. 08/169,483, filed concurrently herewith.

BACKGROUND AND SUMMARY OF THE INVENTION

Information systems for handling numerous document and data formats are moving towards becoming open systems where different devices are tied to one another to provide solutions to customers' needs. A key factor in such open systems is enabling an electronic document to be printed so that the customer does not perceive any difference between versions printed on different output devices. In order to achieve complete device-independence, efficient methods of accurately altering image resolution and performing enhancement are required to take advantage of the technology. Hence, raster conversion technology, where a bitmap created for a first output device is altered so as to be printable on a second output device, has become an important aspect of the open system technology.

The present invention utilizes statistically generated look-up tables to improve document appearance, and more fundamentally, to enable printing of a document by converting from an original resolution to an output resolution equal to that of the printing device. The resulting image signals may then be used to drive devices at the output resolution without impacting spatially sensitive features within the input image. The present invention may be utilized to control a scanning beam where the beam varies in intensity and duration according to the pulses used to control it. For example, a laser beam may be used in a printer for selectively exposing areas on a photoreceptor. The latent electrostatic image formed on the photoreceptor by the beam exposure attracts developing toner, in proportion to the latent image charge level, to develop the image. As another example, a cathode ray tube uses an electron beam to scan a phosphorous screen. The electron beam may be varied in intensity and duration to accurately display information on the phosphor screen. In both examples, a pulse forming circuit responsive to the multiple-bit per pixel image signal may be used to generate video pulses to control the intensity and operation time of the respective beams.

Previously, various methods and apparatus have been used to vary the position and width of pulses used to control laser or CRT beams, and to alter the resolution of bitmapped images. The following disclosures may be relevant:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,544,922 to Watanabe et al. teaches a smoothing circuit for an orthogonal matrix display. The circuit adds or removes a "small dot" on the display from either the first or last third of a dot clock (DCK) period that is one-third the period in which a standard dot of the original pattern is displayed.

U.S. Pat. No. 4,690,909 to Bassetti discloses a method and apparatus for enhancing the apparent resolution of electrophotographic printers using a gray dot replacement technique to enhance low resolution output. More specifically, gray or halftone halos are produced along image edges to provide smoothing, while reducing the width of the image regions to avoid thickening thereof as a result of the halo.

U.S. Pat. No. 4,814,890 to Karo describes an image communicating system for transmitting or receiving image data. In the system, the pixel density of the transmitting image data is converted in accordance with the recording density on the reception side to enable printing by a high-speed laser printer without a change in the image size.

U.S. Pat. No. 4,841,375 to Nakajima et al. discloses an image resolution conversion apparatus that converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 4,933,689 to Yoknis describes a method for enhancing a displayed image in a laser exposed dot matrix format to produce softened edge contours, using three pulses, a central pulse plus leading and trailing enhancement pulses which are separated therefrom. The purpose of the leading and trailing pulses is to create a blurred or grayed region at the leading and trailing edges of each associated character.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,134,495 to Frazier et al. discloses a laser based imaging system that employs a resolution transformation method. The method uses the selective deactivation in overlapping areas between rasters (scan lines). In one embodiment, a single interleaved pixel, between two scan lines, is formed by the sum of up to six laser pulses at pixel points on adjacent scan lines. In some cases the laser pulses are of insufficient intensity to produce a dot or mark at the point on the scan line where the center of the pulse is received.

U.S. Pat. No. 5,138,339 to Curry et al. teaches methods and means for increasing the precision with which optical printers that utilize high gamma recording media, such as xerographic printers, spatially position transitions in the images they print. The invention provides microaddressable display systems for rendering two-dimensional images on photosensitive media. The microaddressability results from the overscanning of intensity modulated spots that superimpose multiple discrete exposures on the recording medium, wherein the separation of the exposure centers is significantly less than the spatial diameter of the spots.

U.S. Pat. No. 5,142,374 to Tajika et al. teaches an image recording apparatus for recording a gradient image by combining dots of different densities. The different density dots are produced by generating a pair of binary signals, one for light ink and one for dark ink, from image data received. The discharge of each ink from a bubble jet is controlled in accordance with the signals.

U.S. Pat. No. 5,150,311 to Long et al. discloses a system for producing print-dot data suitable for driving a hardcopy printing device. More specifically, the print-dot data is selectively obtained from a conversion operation carried out by a matrix and dot generator combination that respectively generate subtractive color components and a pattern of high resolution print-dots therefrom.

U.S. Pat. No. 5,193,008 to Frazier et al. further describes the resolution enhancement apparatus as one that includes the ability to rasterize the image to be printed at twice the resolution of the printer. The printer then outputs the higher resolution image using an interleaving technique that generates developable dots between scan lines by energizing corresponding dots on adjacent scan lines at a level that will not be developed, but where the overlapping portion of the two corresponding dots will be developable.

U.S. Pat. No. 5,206,741 to Shimura et al. discloses an image processing apparatus for processing image data to be output by a printing unit. A conversion unit converts pixel image data within an image memory into data having a resolution equal to the output resolution of the print mechanism.

Donald L. Ort in *Character Edge Smoothing for Matrix Printing*, Xerox Disclosure Journal, Vol. 6, No. 1, January/February 1981, p. 19, describes a method for improving the quality of printed characters. The method described was offsetting of the location of the spots used to produce the character edges by one-half pixel, using either mechanical or electronic means, in order to smooth the edges.

A number of the previously described patents and publications are summarized in Torrey Pines Research, *Behind Hewlett-Packard's Patent on Resolution Enhancement TM Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

L. Steidel in *Technology Overview: Resolution Enhancement Technologies for Laser Printers*, LaserMaster Corp., discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser energy from a brief laser flash, which leaves only residual or fringe energy on the image drum at the periphery of an adjacent pixel on a second scan line.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is suboptimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter. A suboptimal design methodology is investigated for binary filters in order to facilitate a computationally manageable design.

Robert P. Loce et al., in *Optimal Morphological Restoration: The Morphological Filter Mean-Absolute-Error Theorem*, Journal of Visual Communications and Image Representation, (Academic Press), Vol. 3, No. 4, December 1992, pp. 412–432, hereby incorporated by reference, teaches expressions for the mean-absolute restoration error of general morphological filters formed from erosion bases in terms of mean-absolute errors of single-erosion filters. In the binary setting, the expansion is a union of erosions, while in the gray-scale setting the expansion is a maxima of erosions. Expressing the mean-absolute-error theorem in a recursive form leads to a unified methodology for the design of optimal (suboptimal) morphological restoration filters. Applications to binary-image, gray-scale signal, and order-statistic restoration on images are included.

Edward R. Dougherty et al., in *Optimal mean-absolute-error hit-or-miss filters: morphological representation and estimation of the binary conditional expectation*, Optical Engineering, Vol. 32, No. 4, April 1993, pp. 815–827, incorporated herein by reference, discloses the use of a hit-or-miss operator as a building block for optimal binary restoration filters. Filter design methodologies are given for general-, maximum-, and minimum-noise environments and for iterative filters.

In accordance with the present invention there is provided, in a system suitable for depicting a bitmap image, a method for converting an input bitmap having a first resolution into an output bitmap image having a second, reproducible resolution, wherein the second resolution is a non-integer multiple of the first resolution, said method comprising the steps of: (a) creating a plurality of look-up tables, wherein each look-up table represents a unique phase relationship between the first and second resolution bitmaps and where each look-up table entry represents the resulting output to be generated by the look-up table in response to a specific pattern of input pixels within a pixel observation window; (b) determining, as a function of the position of the pixel observation window, the phase relationship for an output pixel in the output bitmap; and (c) generating, in response to the phase relationship and the pattern of input pixels within a pixel observation window, a video signal for the output pixel.

In accordance with another aspect of the present invention, there is provided a method for converting the resolution of a bitmap image having a first resolution, to enable production of a printed output on an electronic reprographic system capable of producing a second resolution image in response to a series of pulse-width, position-modulated signals, wherein the second resolution is a non-integer multiple of the first resolution, comprising the steps of: (a) selecting a target pixel location in the bitmap image; (b) observing a set of pixels within a pixel observation window superimposed on the bitmap image, relative to the target pixel location; (c) generating an index pointer as a function of a subset of the set of pixels; (d) determining, as a function of the position of the pixel observation window within the bitmap image, a phase of the pixel observation window; and (e) generating, as a function of the index pointer and the phase of the pixel observation window, an output pixel to be reproduced by the electronic reprographic system.

In accordance with yet another aspect of the present invention, there is provided a method for converting the resolution of a bitmap image having a first resolution (M), to enable production of a printed output on an electronic reprographic system capable of producing a second resolution (N) image in response to a series of pulse-width, position-modulated signals, wherein the second resolution is a non-integer multiple of the first resolution, comprising the steps of: (a) selecting a target pixel location in the bitmap image; (b) observing a set of pixels within a pixel observation window superimposed on the bitmap image, relative to the target pixel location; (c) generating, as a function of the states of the set of pixels, a third bitmap image having a common resolution K, wherein K is a common multiple of M and N; and (d) subsampling the third bitmap image so as to generate a series of second resolution pulse-width, position-modulated signals for output by the electronic reprographic system.

In accordance with a further aspect of the present invention, there is provided an electronic printing apparatus capable of printing a bitmap image having a first resolution by producing a series of pulse-width, position-modulated signals at a second resolution wherein the second resolution is a non-integer multiple of the first resolution, comprising: pixel selection means for selecting a target pixel location in the bitmap image; image memory for recording the binary states of a set of pixels in the bitmap image located within a pixel observation window positioned relative to the target pixel location; a pixel state register for storing an address generated as a function of the binary states of a subset of the pixels stored in said image memory; phase control logic for determining a phase of the pixel observation window; and translating means, responsive to the value stored in said pixel state register and the phase of the pixel observation window, for outputting a pulse attribute word that defines the characteristics of the pulse-width, position modulated signal used to print the target pixel so as to enhance the resulting printed output.

BRIEF DESCRIPTION OF THE DRAWINGS

FIGS. 11A through 11E illustrate the resolution conversion process of the present invention as applied to a single raster line in accordance with the remaining two phase relationships depicted in FIGS. 8C and 8D;

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
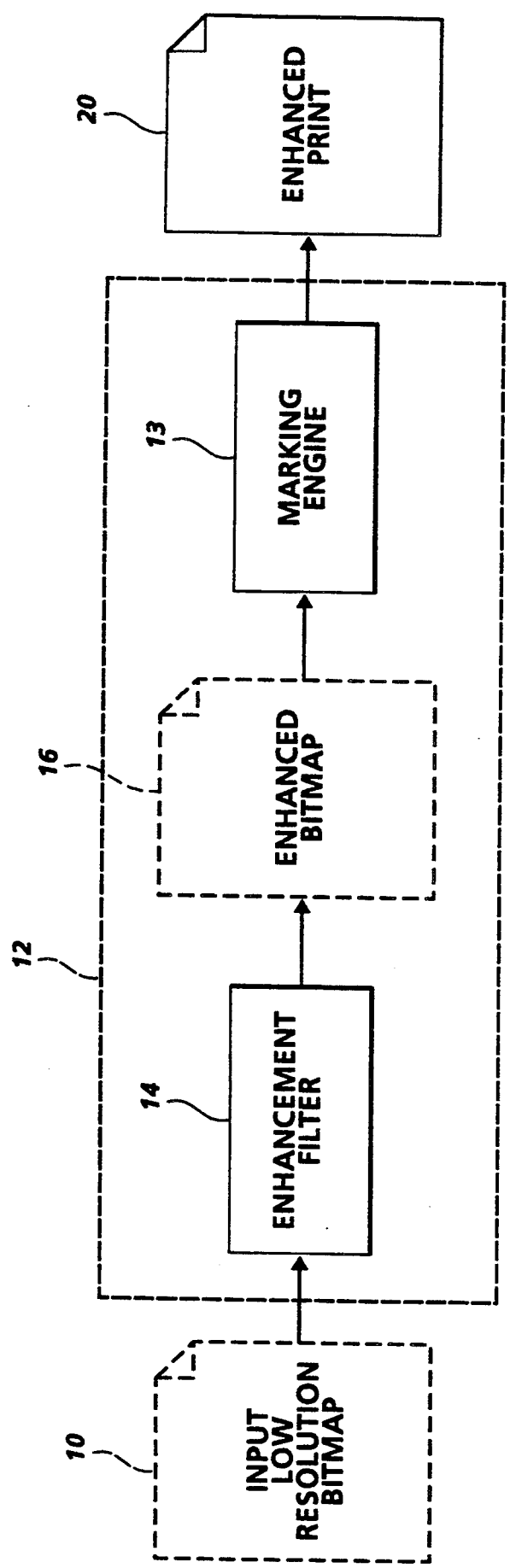
FIG. 1 is a block diagram of a digital printer embodiment employing the present invention.

For a general understanding of the present invention, reference is made to the drawings. In the drawings, like reference numerals have been used throughout to designate identical elements. FIG. 1 is a block diagram of a digital printer that illustrates a preferred embodiment of the present invention. As used herein, the terms video signal and image signal are intended to describe any form of digital signal used to represent a pixel within a bitmap image, be it for display, printing, or transmission thereof. As shown, a low resolution bitmap image 10 is presented to a digital printer 12 to produce printed output. Within the digital printer employing the present invention is enhancement filter 14 that transforms the input bitmap into an enhanced bitmap image 16. The enhanced bitmap image is then passed to marking engine 18 for exposure and development, as will be described with respect to FIG. 3, to produce enhanced output print 20 at a resolution different than that of low resolution bitmap image 10. Although the preferred embodiment described herein is an electronic printing system, the present invention may be applied to other systems where non-integer resolution conversion is required, for example, a computer display.

Figure 2:
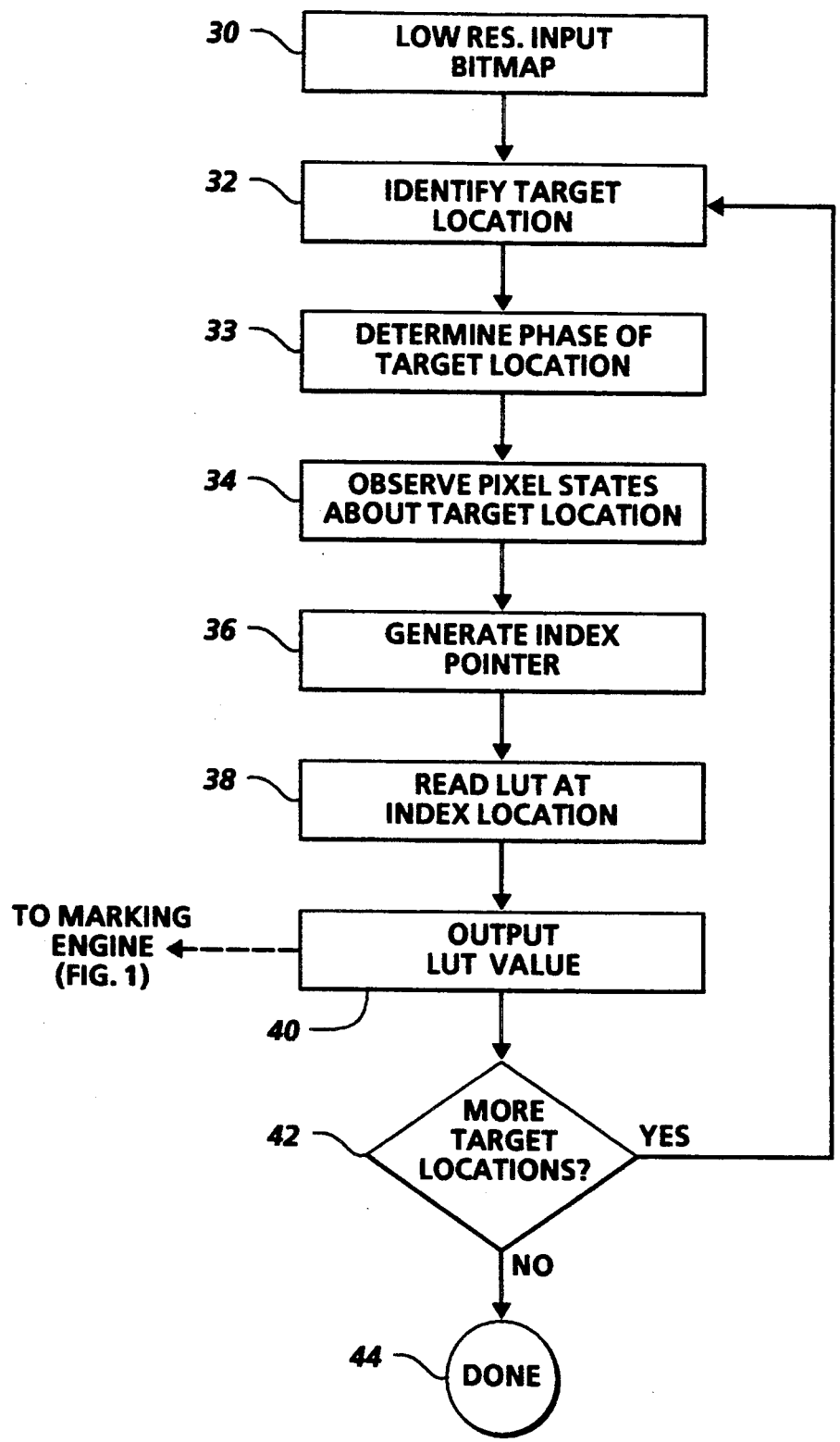
FIG. 2 is a flowchart illustrating the process steps necessary to accomplish image resolution enhancement in accordance with the present invention.
Figure 3:
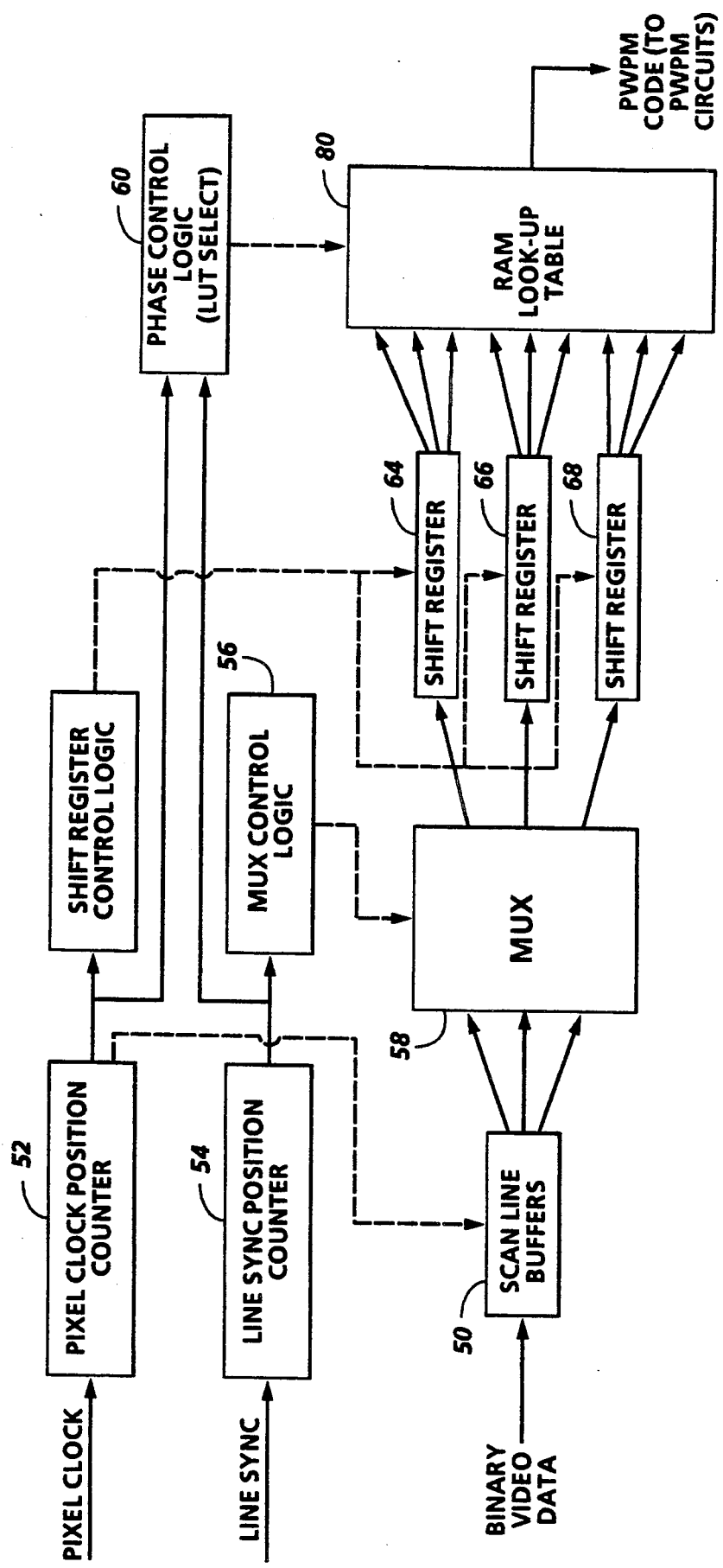
FIG. 3 is a simplified functional block diagram of a preferred hardware implementation for accomplishing image resolution enhancement in accordance with the present invention.
Figure 4:
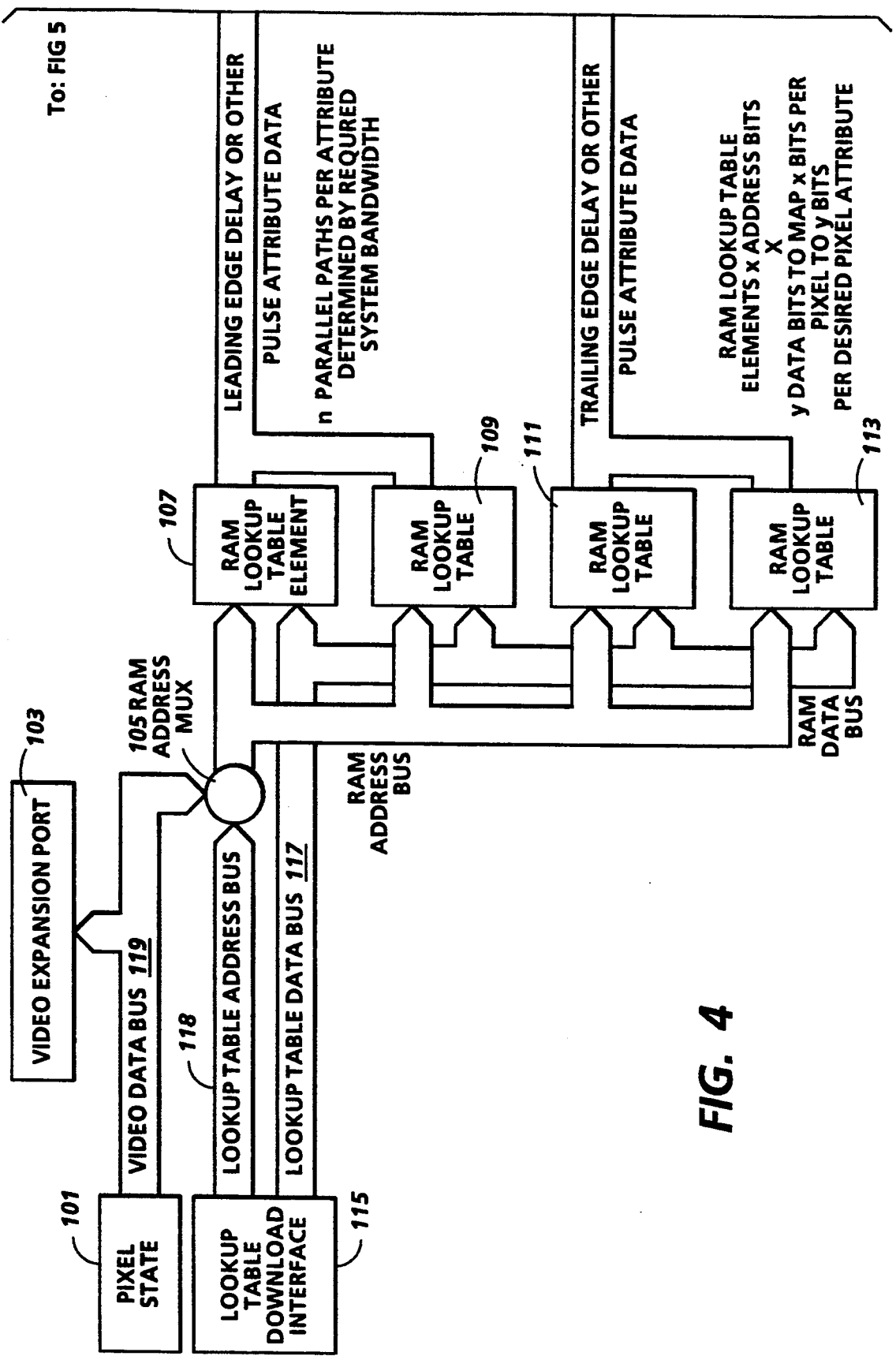
FIGS. 4 and 5 show a schematic block diagram of a pulse modulator according to an embodiment of the present invention.
Figure 5:
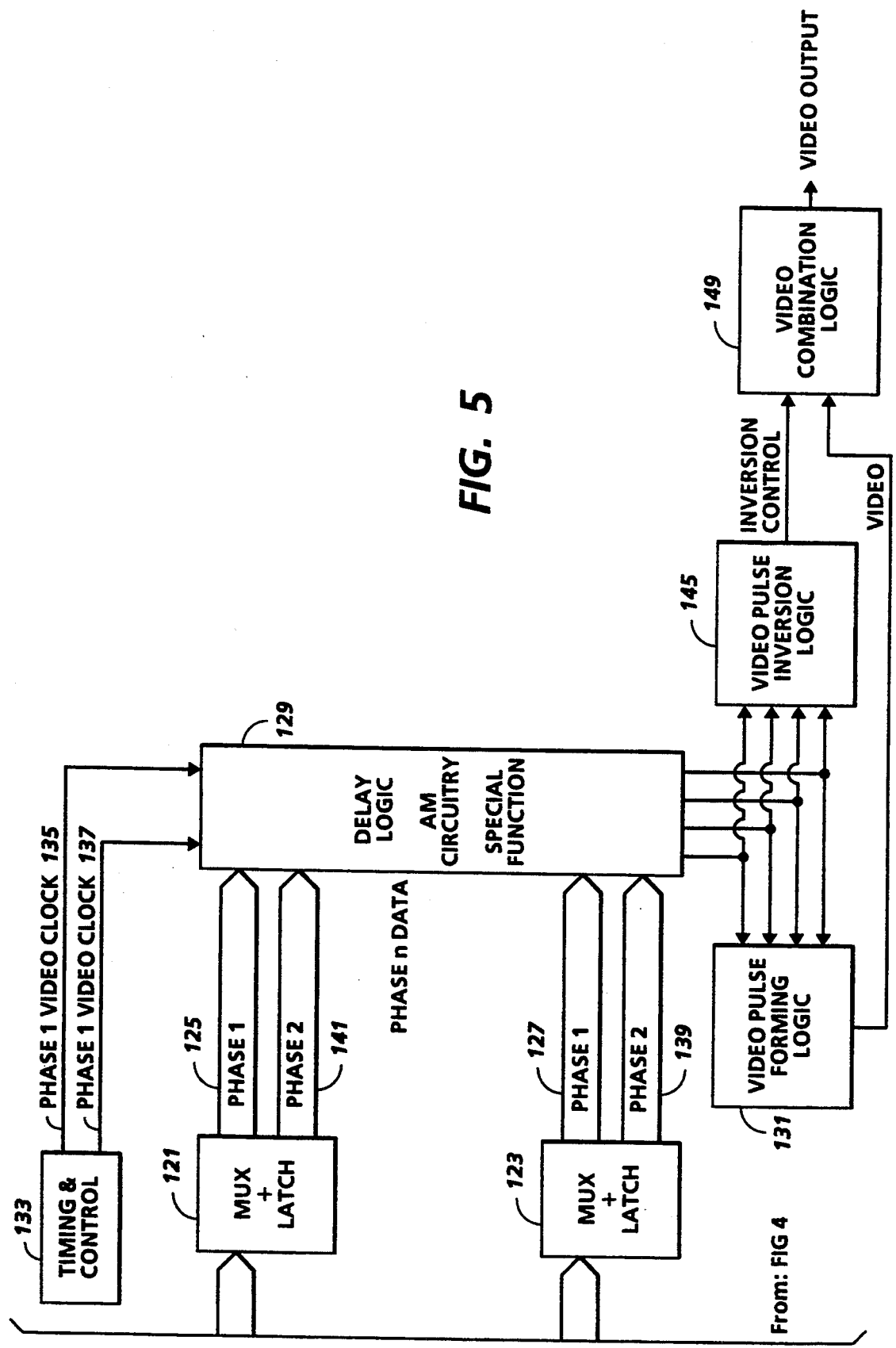

FIG. 2, in conjunction with FIGS. 3, 4, and 5, illustrates the operation of the image resolution enhancement filter represented by block 12 in FIG. 1. Beginning with step 30, the low resolution bitmap image 10 of FIG. 1 is retrieved. Next, a target position is identified within the input bitmap at step 32, where the target location represents the location where a group of target pixels, which have been resolution enhanced, will be generated. The resolution enhanced target pixels are generated by the following operations. Given the target location, an index pointer is generated to select the appropriate look-up table for that location, or more specifically, for that phase of the pixel observation window, step 33. At step 34, the "on" or "off" states (i.e., a binary input image in the present embodiment) of a set of pixels surrounding or in close proximity to the target pixel position are observed through, what is termed "the pixel observation window." In a practical sense, the step of observing the pixel states is equivalent to retrieving the binary image signal level for each pixel within the set of pixels. Moreover, the set of pixels is determined as a function of the design of the template-based filter as will be described with respect to FIGS. 7 and 8, and as described in copending application Ser. No. 08/169,483 by Eschbach, filed concurrently herewith, the relevant portions thereof having been previously incorporated by reference for their teachings.

Having observed the pixel states in the observation window about the target location, step 34, the states are used to generate an index pointer, preferably a series of binary values stored in an address register, step 36. Once generated, the index pointer may then be used to access a location in a memory or preferably a look-up table (LUT) that has been chosen according to the phase of the target location, step 38. Once a particular location of the LUT is accessed, a data value, or values stored therein are placed on a data bus for output to the marking engine as represented by step 40. Having completed the generation of the enhanced output for the target location, the process repeats if additional pixels remain to be generated for the output image (more target locations), as determined by step 42. If all pixels within the output image have been generated, the process is complete, step 44.

Turning next to FIGS. 3, 4 and 5, an architecture capable of executing the aforedescribed operations of the enhancement filter will now be described. FIG. 3 is a simplified functional block diagram illustrating the details of a hardware circuit that would be used to implement the present invention. A set of scan line buffers 50 would store enough lines of the input bitmap 10 (FIG. 1) to support the observation window size employed in the enhancement operation, preferably a 5×5 window (note, the figures illustrate an alternative 3×3 window for simplicity of the schematics). The scanline buffers are loaded at the pixel clock rate, in this case the higher resolution/faster clock, and addressed by the pixel clock position counter 52. Mux control logic block 56, responsive to line sync position counter 54, controls Multiplexer (Mux) 58, which in turn routes the scan line buffer output to the appropriate shift register, 64, 66, or 68, which implement the pixel observation window. Every nth line, 5th line for a 5×5 window embodiment, the mux control logic causes the mux address to be held, thus repeating that set of matrices and allowing multiple sets of outputs in the process (slow scan) direction. A set of shift registers or equivalent alignment circuitry would, in response to shift register control logic circuit 62, match the buffered video data to the inputs of look-up table 80 (shown as 107, 109, 111, and 113 in FIG. 4) to produce the resultant pulse-width, pulse modulated (PWPM) code. Every n'th pixel clock, or 5'th pixel for this 5×5 example, the shift register control logic causes the shift registers to skip a shift(s) and the look-up table output is clocked by the pixel clock, thus causing multiple pixels to be output for the matrix represented by that location. The output of the look-up table is latched by pixel state register 101 (FIG. 4) clocked at the pixel clock rate. Also included is a phase control logic block that may be used, in a preferred embodiment, to select from a plurality of look-up tables, wherein each of the independent look-up tables represents a distinct phase relationship between the input and output bitmap images as will be described with respect to FIGS. 9A-9D, 12A-12D, and 13A-13P.

As will be described herein, the contents of look-up table 80 are predetermined in accordance with the enhancement operation that is to be accomplished. For example, the look-up table may implement morphological or template-based matching filters to modify or enhance the image as desired. In a preferred embodiment, the filters used attempt to minimize the mean-absolute-error of the output image, or the pixel count difference between the output image and an ideally transformed image.

As shown in FIGS. 4 and 5, a series of data words, each n bits per pixel where n is 8 in the preferred embodiment, is input into the pulse modulator from pixel state register 101, where the value therein is a function of the pixel states in the observation window associated with the target location of the image bitmap (step 36 of FIG. 2). The series of data words may be sent through a video expansion port 103 to other pulse modulators (not shown) for parallel processing, such as in the case of color printing where similar processing of the video information is performed for different colors.

It may be noted with respect to the following description that in terms of an alternative embodiment (not shown), where Pulse Width Pulse Position video circuitry is not employed and single bit per pixel output is desired, the video electronics may be greatly simplified. The look-up output from LUT 80 would be a single bit that would be latched to the appropriate video drive circuitry.

The phase control logic block 60 (FIG. 3) is an extension of the pixel shift hold and mux line hold functions described above in that during normal clocking and shifting periods a particular set of look-up tables would be addressed. During shift hold or line hold periods a different set of look-up tables could be addressed to further enhance the characteristics of the resultant video output pulses. The present invention further includes translating means, splitting means, pulse forming means, and generating means. In the pulse modulator of FIGS. 4 and 5, a data word from the series is sent through a RAM address multiplexer 105 to a translating means. As embodied herein, the translating means comprises four random access memory (RAM) look-up tables 107, 109, 111, and 113. Each data word represents an address within the four RAM look-up tables 107, 109, 111, and 113. In a preferred embodiment, a pair of 256×4 ECL RAM look-up tables is used to generate a pulse attribute word for each pulse attribute sought to be controlled.

Pulse attributes may include leading edge delay, trailing edge delay, amplitude of the pulse to be formed, and other special features such as an inverted or multiple pulse per pixel selection. Alternatively, a single 256×8 ECL RAM look-up table may be used to generate each pulse attribute word. The embodiment of FIG. 4 shows two pairs of 256×4 RAM look-up tables 107 and 109, 111 and 113 that correspond to the two pulse attributes of leading edge delay and trailing edge delay. The pulse modulator will accommodate as many pairs of 256×4 RAM look-up tables as there are desired pulse attributes. For example, a third pair of 256×4 RAM look-up tables may be used to control the amplitude of a pulse to be formed. Alternatively, a series of RAM addresses in the look-up tables may be assigned to produce inverted pulses. For example, addresses 64-127 would be decoded so that the pulses produced in response to the data output from those table locations would be inverted. Furthermore, a larger or smaller number of addresses may be used, or allocated, for the production of inverted pulses.

Once an address in each RAM look-up table is accessed by the data word from the pixel state register, each RAM look-up table generates a nybble (4 bits) of information. Thus, each pair of RAM look-up tables generates a pulse attribute word (8 bits) corresponding to the pulse attribute sought to be controlled. While an 8-bit implementation may be preferable, it is not a limitation, and the pulse attribute word may be any number of bits (e.g., 4, 6, 8, 10, 12, etc.).

Characteristic data indicative of the pulse attributes sought to be controlled in a pulse modulator may be downloaded into the RAM look-up tables 107, 109, 111, and 113 from the look-up table download interface 115. Once the look-up table download interface 115 accesses an address of a RAM look-up table, a pulse attribute data nybble may be loaded into the RAM look-up table through the look-up table data bus 117 from the look-up table download interface 115. This allows for different mapping functions in the same pulse modulator for different printing characteristics (i.e., font smoothing, graphics, etc.), and further facilitates maintenance of print quality as the components of the system age. After the RAM look-up tables 107, 109, 111, and 113 are loaded, the look-up table download interface 115 instructs the RAM address multiplexer 105 to receive data from the video data bus 119.

In the embodiment of FIG. 4, the four RAM look-up tables 107, 109, 111, and 113 perform the mapping function represented by steps 38 and 40 of FIG. 2, which translates the incoming data word into two pulse attribute words to control the formation of a pulse. In FIG. 4, the top two RAM look-up tables 107 and 109 generate separate nybbles of pulse attribute information that combine to form a pulse attribute word for the leading edge delay of a pulse to be formed. The bottom two RAM look-up tables 111 and 113 generate separate nybbles of pulse attribute information that combine to form a pulse attribute word for the trailing edge delay of a pulse to be formed.

As illustrated in FIG. 5, each pulse attribute word is fed to a respective splitting means that comprises multiplexer and latch blocks 121 and 123. In the preferred embodiment, each respective multiplexer and latch block contains two latches, one for each of the phase 1 and phase 2 buses. The two pulse attribute words generated in the RAM look-up tables 107, 109, 111, and 113 from data words are latched onto the phase 1 buses by their respective multiplexers 121 and 123 at a leading edge of a pulse from the phase 1 video clock 135.

The two data words latched on their respective phase 1 buses 125 and 127 are further processed on separate channels in a pulse forming means corresponding to each channel. As depicted, the pulse forming means comprises a delay logic block 129 for forming separate leading and trailing edge delayed pulses and a video pulse forming logic block 131. The video pulse forming logic block 131, which comprises the generating means, forms a single pulse from the leading and trailing edge delay pulses. Subsequent to generation of the first or normal pulse in the video pulse forming logic block 131, the pulse may be inverted under the control of the combination logic block 149.

As represented by the preferred embodiment depicted in FIG. 5, video combination logic block 149 allows the video signal from video pulse forming logic block 131 to pass unaltered if a logic zero is present on the inversion control line. On the other hand, at any time the video pulse inversion logic block 145 should produce a logic one on the inversion control line, the video pulse signal output from block 131 will be inverted so as to form a pair of video pulses.

It is noted that the speed of a typical scanning system, with only a single phase video clock and corresponding phased set of buses, is limited by the speed at which its delay and pulse forming logic 129 and 131 can operate on pulse attribute words and then be reset to accept new pulse attribute words. In the embodiment shown in FIG. 5, with only the phase 1 video clock 135 and phase 1 buses 125 and 127, the delay and pulse forming logic blocks 129 and 131 may limit the processing speed of the pulse modulator. Specifically, while the two pulse attribute words corresponding to the first data word are being processed by the delay and pulse forming logic blocks 129 and 131, a second pair of pulse attribute words corresponding to a second data word will already be formed, waiting at the respective multiplexer and latch blocks 121 and 123 to be latched onto the phase 1 buses 125 and 127 and processed by the delay and pulse forming logic 129 and 131.

Figure 6:
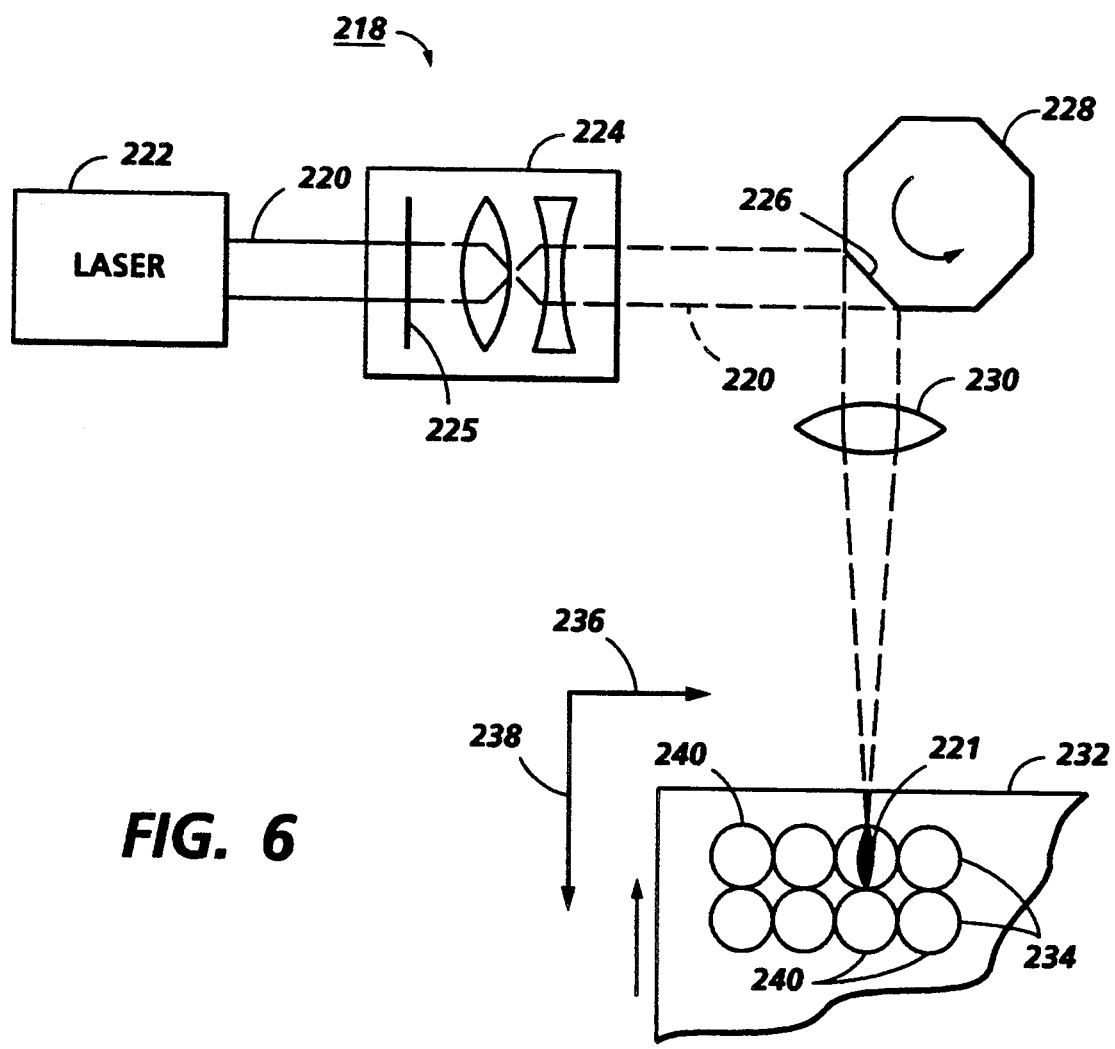
FIG. 6 is a schematic illustration of a Raster Output Scanner (ROS), illustrating a portion of the photosensitive image plane.

Referring now to FIG. 6, upon receiving the video output from combination logic block 149 of FIG. 5, a marking engine in the form of raster output scanner (ROS) 218 may be used to print the video signals of the enhanced bitmap. There are two common types of ROS 218, flying spot and pulsed imaging. In both, a laser beam 220, emitted from laser 222, passes into conditioning optics 224 that may include a modulator 225. For precise periods of time, determined in response to video signals supplied to ROS 218, modulator 225 either blocks or deflects the laser beam, or allows the beam to pass through the conditioning optics to illuminate a facet 226 of rotating polygon 228. Laser 222 may be a helium-neon laser or a diode laser. In the latter case, the video data could directly modulate the laser rather than modulator 225. In addition, more than a single laser source 222 or beam 220 could be employed to practice the invention.

After reflecting off facet 226, laser beam 220 passes through conditioning optics 230 and forms a spot 221 on photosensitive image plane 232. The rotating facet causes laser spot 221 to scan across the image plane in a line 234. Line 234 lies in what is commonly referred to as the fast scan direction, represented by arrow 236. In addition, as facet 226 rotates, image plane 232 moves in a slow scan direction, substantially perpendicular to the fast scan direction, as represented by arrow 238. Movement in the slow scan direction is such that successive rotating facets of the polygon for successive scan lines 234 are offset from each other in the slow scan direction. Subsequent to exposure the latent electrostatic image remaining on photosensitive image plane 232 is developed using any commonly known charge sensitive development techniques so as to produce a developed image that is transferable to an output medium.

Each scan line 234 consists of a row of pixels 240, wherein the pixels are produced by the modulation of the laser beam as laser spot 221 scans across the image plane. As beam 220 scans across the scan line, laser spot 221 either illuminates or does not illuminate the individual pixel, in accordance with the video signals provided to ROS. In general, the video signals may be characterized as a serial stream of pulses, where a logic one or a pulse specifies that the beam is to illuminate the surface, while a logic zero, no pulse, will result in no illumination.

For both types of ROS, the width of pixel 240 is dependent upon the period or duration of the corresponding logic one pulse in the video signal supplied to ROS 218. In a scanning spot ROS, at the leading edge of a pulse, modulator 225 allows the passage of laser beam 220 onto the image plane. For the duration of the pulse, an oval shaped laser spot 221 is scanned across image plane 232, illuminating at least one addressed pixel 240 within the scan line 234. The width of the illuminated region in the fast scan direction thus depends on the duration of the video pulse, as well as on the width and scanning rate of laser spot 221. Typically, the dimensions of the laser spot are such that it is two to three times wider in the slow scan direction than its width in the fast scan direction. As an example, in a 600 spot per inch, 135 page per minute, dual beam printer, the laser spot at half the maximum intensity is approximately 43 $\mu$m wide in the slow scan direction and 20 $\mu$m wide in the fast scan direction, and the time period required for the spot to scan across the width of a single pixel 240 is about 15 nanoseconds.

Typically, the video data used to drive the ROS is clocked so that the period during which each pixel is exposed, referred to hereafter as a pixel clock period, is the same. In addition, the video data used to generate the video signal pulses that drive the modulator are also synchronized with ROS 218 and the movement of the image plane 232 in the slow scan direction, thereby allowing a particular bit of video data to address an appropriate portion of image plane 232. The synchronization of the video data, the video signal pulses produced therefrom, the ROS and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path.

In the present embodiment, a pulse-width, position, and amplitude modulator (pulse modulator) is utilized to form the video signal pulses in response to video data representing the image to be printed. It is noted that while the following description is directed toward a single color output, this is for simplicity of description only and there is no intent to limit the application of the present invention in such a manner.

Figure 7:
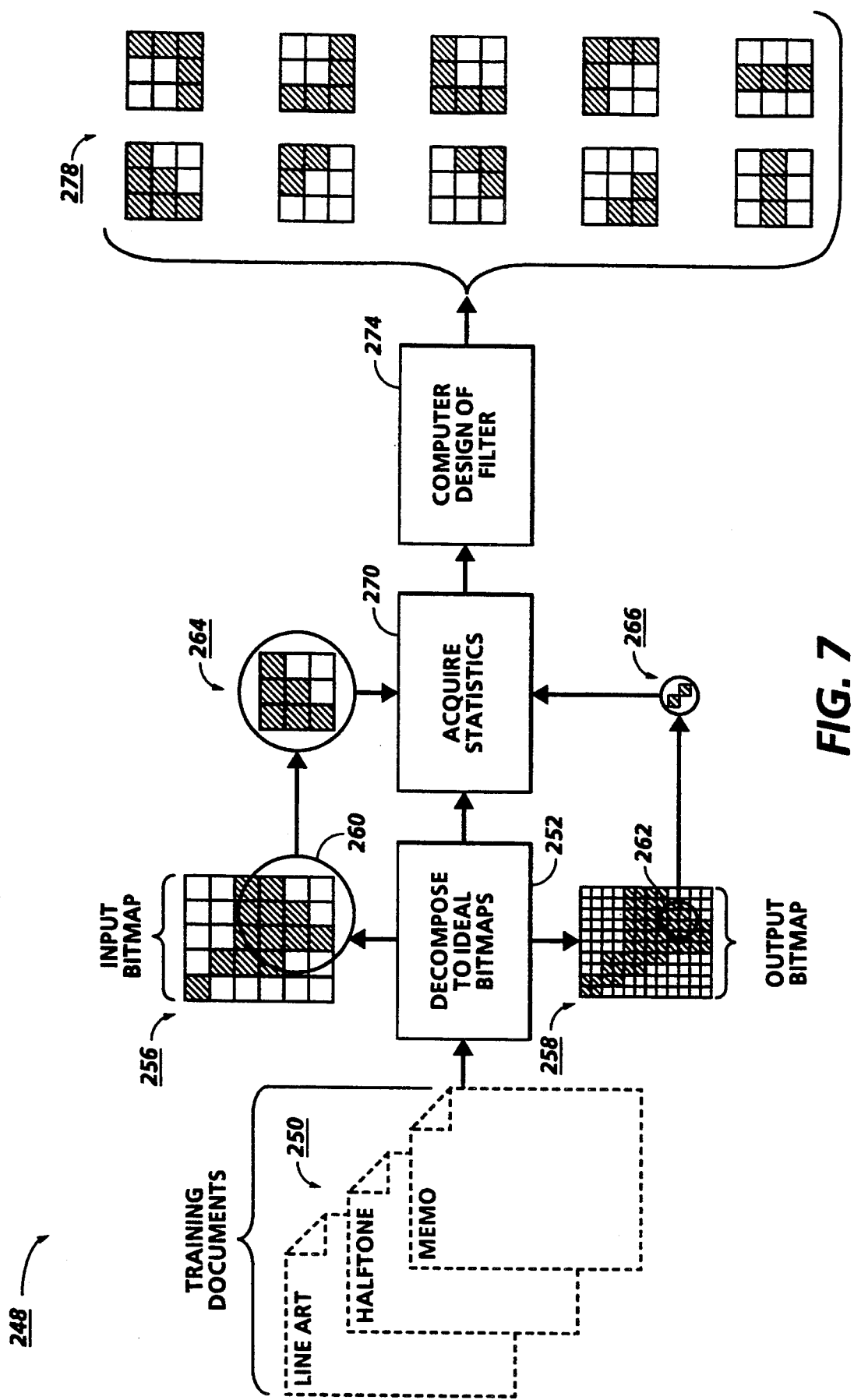
FIGS. 7 and 8 are block diagrams illustrating the various stages in the process used to design the resolution enhancement filters employed by the present invention.
Figure 8:
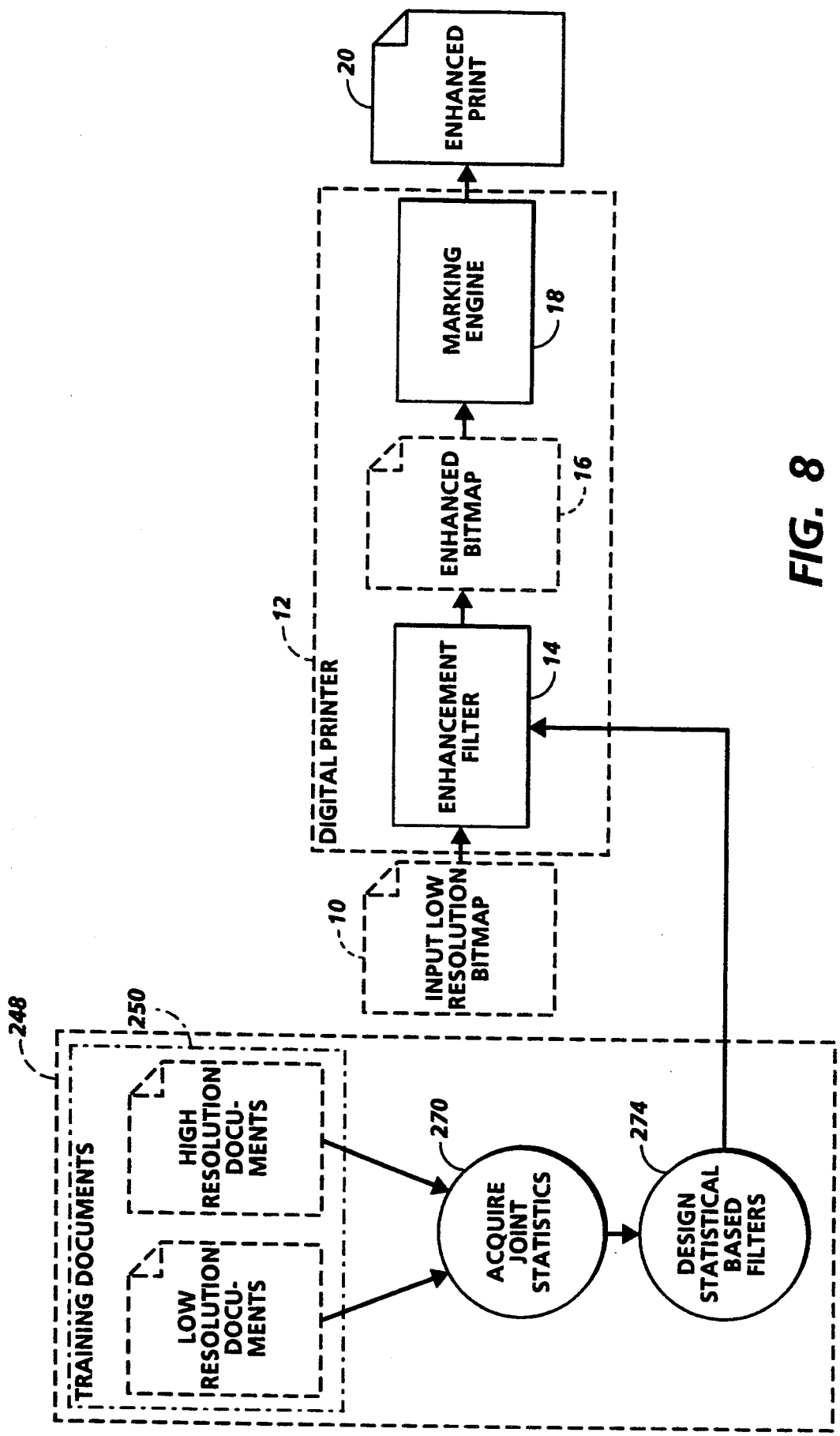
Figure 9A:
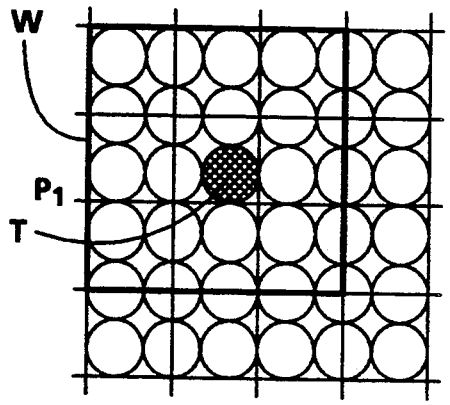
FIGS. 9A through 9D are illustrative examples of the four phase relationships that a pixel observation window oriented with respective target pixels, utilized by the present invention to accomplish a 2-to-3 resolution conversion, could occupy with respect to the underlying bitmap image.
Figure 9B:
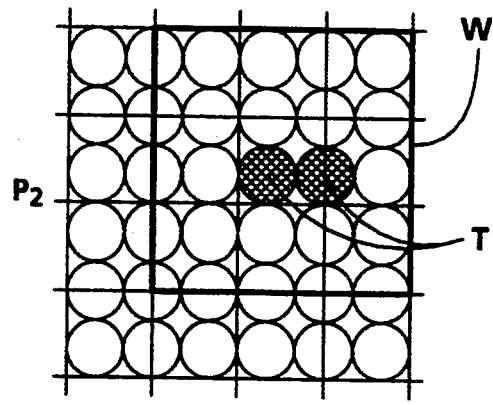
Figure 9C:
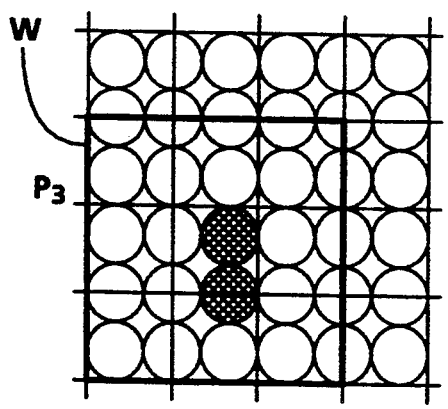
Figure 9D:
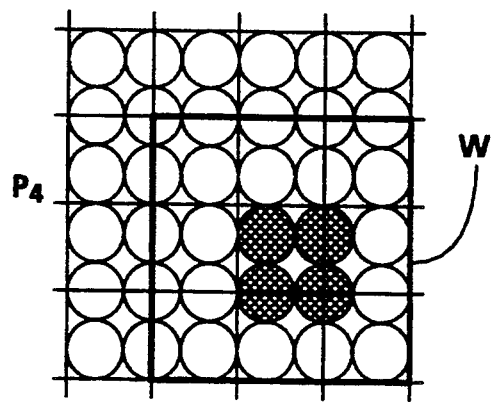
Figure 10A:
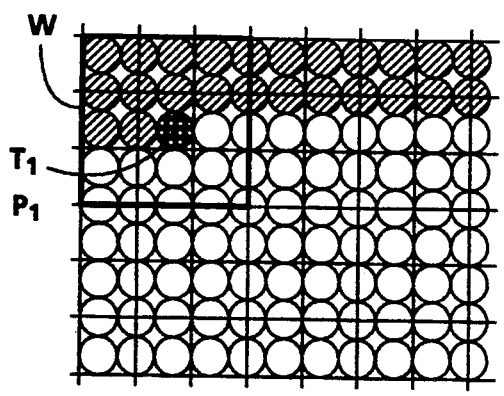
FIGS. 10A through 10E illustrate the resolution conversion process of the present invention as applied to a single raster line in accordance with two of the phase relationships depicted in FIGS. 8A and 8B.
Figure 10B:
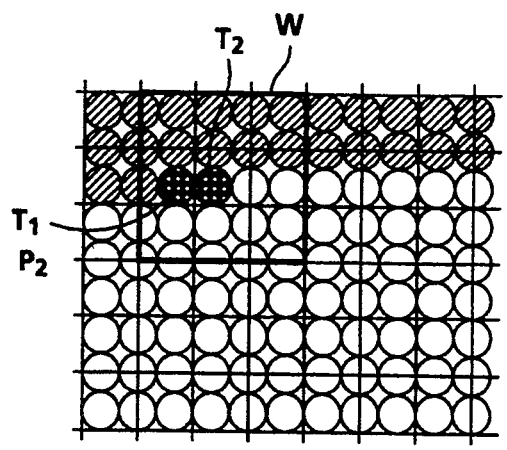
Figure 10C:
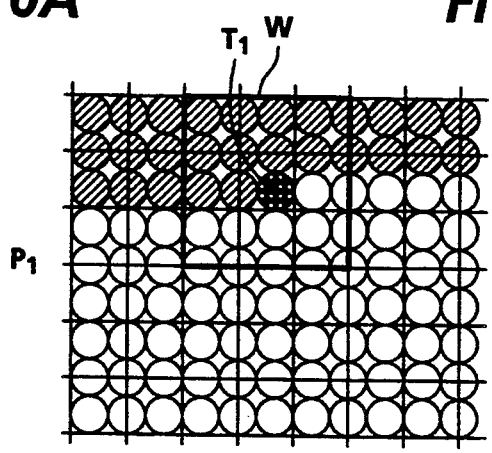
Figure 10D:
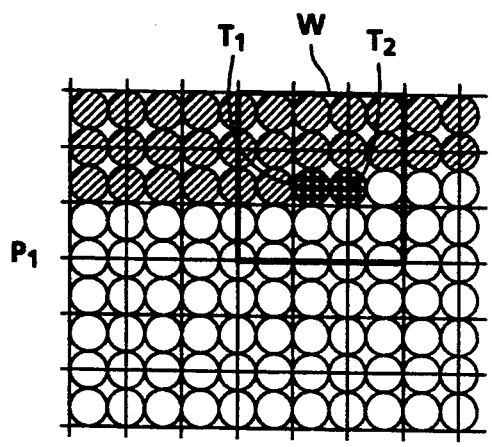
Figure 10E:
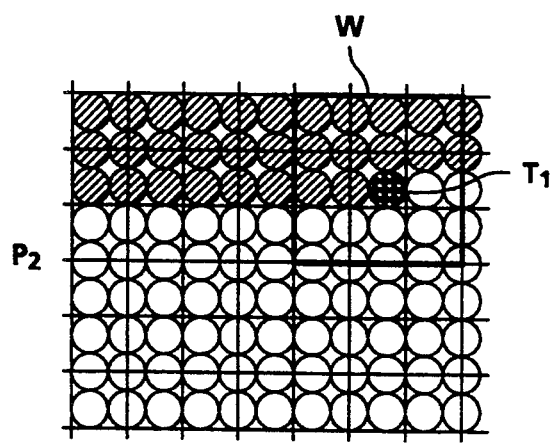
Figure 12A:
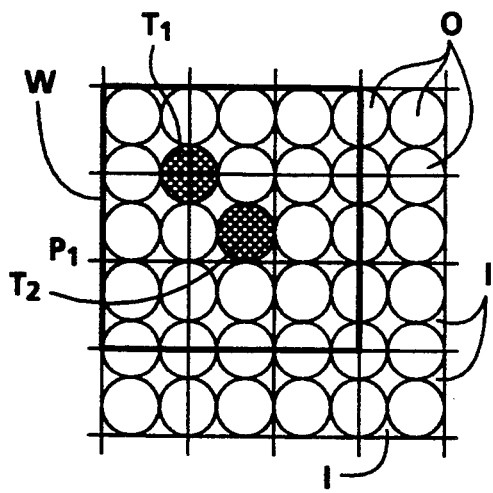
FIGS. 12A through 12D are illustrative examples of an alternative set of target pixels for the four phase relationships that the pixel observation window, utilized by the present invention to accomplish a 2-to-3 resolution conversion, could occupy with respect to the underlying bitmap image.
Figure 12B:
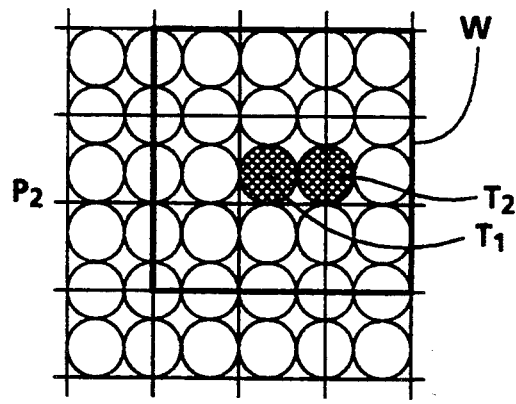
Figure 12C:
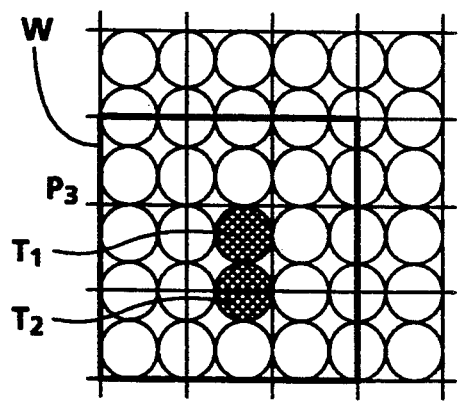
Figure 12D:
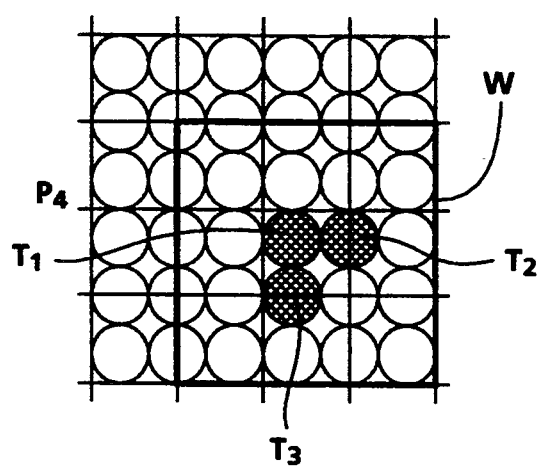

Having described in detail a preferred hardware embodiment for the present invention, attention is now turned to a preferred embodiment for the process used to design the resolution enhancement filters employed in the hardware embodiment. More specifically, FIGS. 7 and 8 are block diagrams generally illustrating the various stages in the resolution enhancement filter design process 248. As the enhancement filter is implemented as a set of look-up tables, the information stored in the individual look-up table memory locations is determined using a conditional expectation, which is obtained from a training set of bitmaps. For further background on the conditional expectation and how it is used in an image processing setting, see *Optimal mean-absolute-error hit-or-miss filters: morphological representation and estimation of the binary conditional expectation*, SPIE Journal of Optical Engineering, vol. 32, no. 4

April 1993, pp. 815–27, the relevant portions of which are hereby incorporated by reference. As FIG. 7 illustrates, a set of training documents 250 is initially chosen as representative of printed matter that will typically be printed by the printer and digitized into images. Subsequently, the images are decomposed at block 252 into a pair of bitmaps 256 and 258. Input bitmap 256 represents the image at the original bit resolution (M, not equal to 1), whereas output bitmap 258 represents the image at the printer's bit resolution (N), where the present invention will produce an M-to-N resolution enhancement. In addition, the resolution of output bitmap 258 may be an anamorphic output. For example, the slow scan resolution may be the same in the two bitmaps while the fast scan resolution is a non-integer multiple of the input resolution.

To further illustrate this process, consider the following. In designing a look-up table resolution enhancement filter for enhancing a 200×200 spot per inch (spi), 1 bit/pixel bitmap [200×200×1] to produce a 300×300 spi, 1 bit/pixel bitmap [300×300×1], the training set of document images would be decomposed to a 200×200×1 input image and a 300×300×1 output image. This would result, as illustrated in FIGS. 9A through 9D, in each window target location within the original bitmap being used to generate the video signal output to the pulse-width, pulse modulated (PWPM) modulator for one, two or four output pixels, depending upon the phase relationship between the bitmaps. Illustrated in FIGS. 9A through 9D are the four possible phase relationships that would be used to produce the desired output. Specifically, FIGS. 9A through 9D respectively represent phases $P_1$ through $P_4$.

After decomposing the training documents to obtain representative input and output bitmaps, individual windowed sections thereof are viewed, represented by regions 260 and 262 so as to produce extracted windowed pixels of the images, 264 and 266, respectively. These extracted portions are then analyzed by block 270 so that statistics may be acquired. The statistics are primarily intended to record the number of times a given output pattern (e.g. pulse-width, pulse modulated (PWPM) codes for the target pixels) occurs for a particular pattern of pixels within the extracted window of pixels from the input image. A 3×3 input window region is illustrated in FIG. 7, however, there is no intent to limit the present invention to that particular size.

Once the statistics are acquired at block 270, the information is passed to filter design block 274 where the information is analyzed to find the most frequently occurring output pattern (pulse-width, pulse modulated codes for the target pixels) for each arrangement of input pixels that was observed. The most frequently occurring output pattern is then selected to be stored in the look-up table at the address location corresponding to the input pixel binary pattern, as represented by patterns 278. As shown in FIG. 8, design process 248 produces a set of statistically designed enhancement filters, which are applied by the digital printer 12.

Turning now to FIGS. 9A–9D, 10A–10E and 11A–11E, further details of a 2-to-3 resolution enhancement operation will be described. As seen therein, observation window W is passed through the input bitmap to target locations that are related to output target pixels T that are to be generated for the output bitmap. The number of pixels to be generated at any one observation window is dependent upon the phase relationship between the input bitmap, shown in the figures as small squares I, and the output bitmap, shown in the figures as small pixels O. As seen in FIGS. 9A through 9D, four phases, $P_1$–$P_4$ respectively, can occur with respect to the 300 spot per inch output image sampling.

As an example, for a given raster line N, phases $P_1$ and $P_2$ occur. As previously described, corresponding look-up tables $L_1$ and $L_2$, for instance RAM look-up tables, would be used to generate the output pixels. Referring to the example 2-to-3 conversion illustrated in FIGS. 10A–10E, a single output target pixel $T_1$ is produced every time phase $P_1$ was detected along raster line N, and a pair of target pixels $T_1$ and $T_2$ every time phase $P_2$ was detected. Thus, three output pixels O are generated along the horizontal direction for every two input pixels I. As the observation window W is stepped down to successive scan lines, a similar process is carried out using the phase $P_3$ and $P_4$ relationships, producing multiple output pixels in the vertical direction. Referring to the example shown in FIGS. 11A–11E, output pixels $T_1$ and $T_2$ are produced each time a phase $P_3$ relationship is detected between the input and output bitmaps (FIGS. 11A, 11C, ad 11E). Similarly, output pixels $T_1$–$T_4$ are produced each time a phase $P_4$ relationship is detected between the input and output bitmaps as shown, for example, in FIGS. 11B and 11D.

Although the 2-to-3 resolution conversion operation has been described an illustrated with respect to the four phases illustrated in FIGS. 9A through 9D, alternative pixel generation schemes may be employed. For example, FIGS. 12A–12D illustrate an alternative set of output pixel combinations that may be employed with the four phases $P_1$–$P_4$, respectively. For statistical reasons this set may be preferable, while for hardware implementation and video timing simplification the set of FIG. 9, or a similar set, may be preferable. The statistical advantage of the set of FIG. 12 is that the filter need not be designed to generate a full group of four pixels from the windowed data. As seen in the figures, observation window W is passed through the input bitmap in relationship to target output pixels T that are to be generated for the output bitmap. Depending upon the phase relationship between the input bitmap I and the output bitmap O, either two or three pixels are produced for the target pixel in the center of the observation window at each phase. Execution of the conversion process would be identical to the process previously described with respect to the pixel generation schemes illustrated in FIGS. 9A–9D.

Figure 13D:
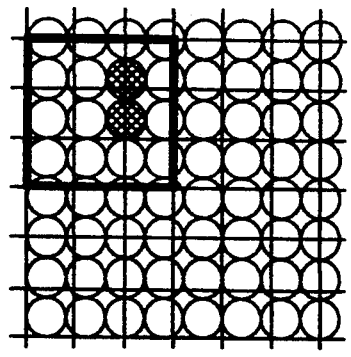
FIGS. 13A through 13P are illustrative examples of a set of sixteen possible phase relationships that the pixel observation window, utilized by the present invention to accomplish a 4-to-5 resolution conversion, could occupy with respect to the underlying bitmap image.
Figure 13C:
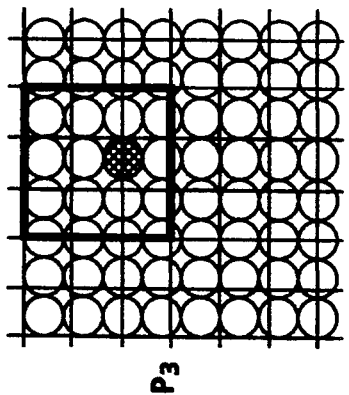
Figure 13B:
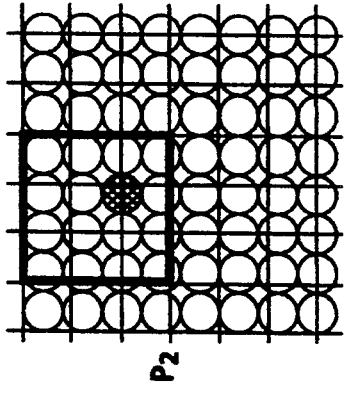
Figure 13A:
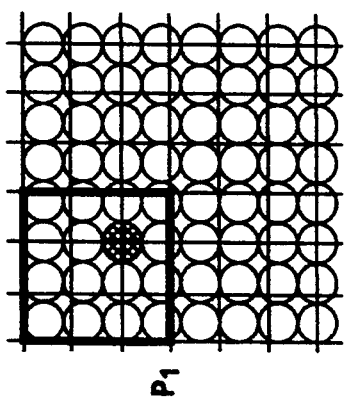
Figure 13H:
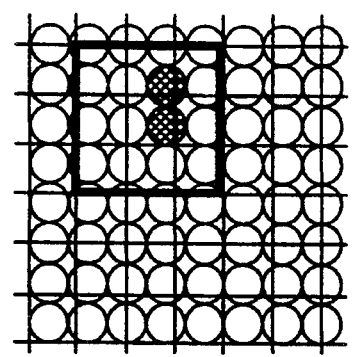
Figure 13G:
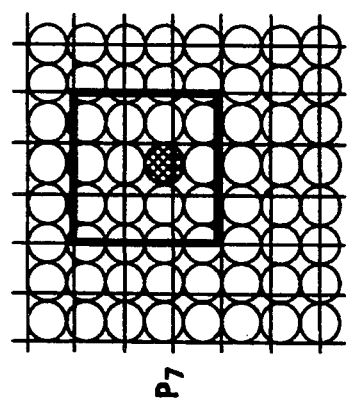
Figure 13F:
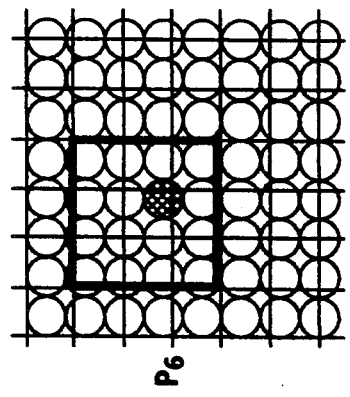
Figure 13E:
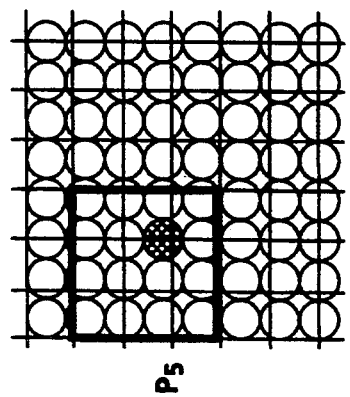
Figure 13L:
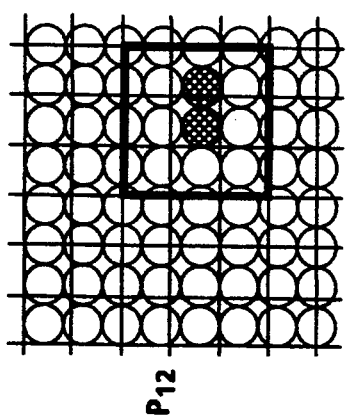
Figure 13P:
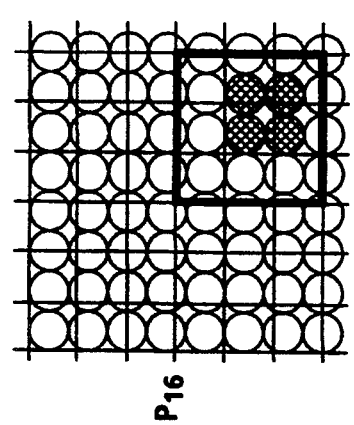
Figure 13K:
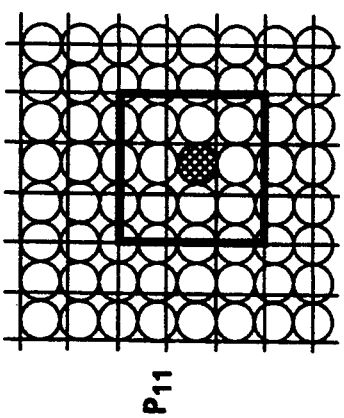
Figure 13O:
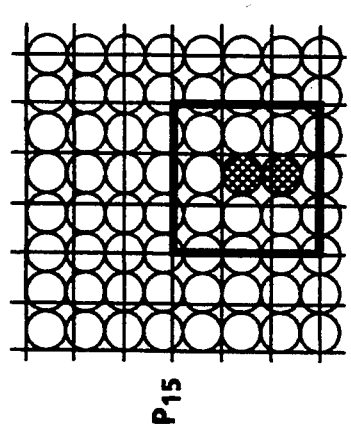
Figure 13J:
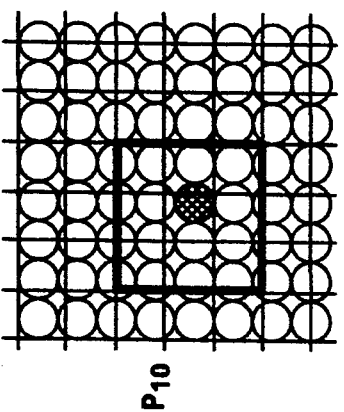
Figure 13N:
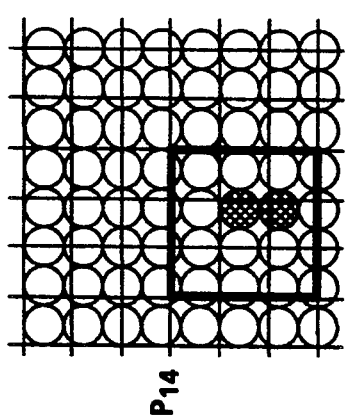
Figure 13I:
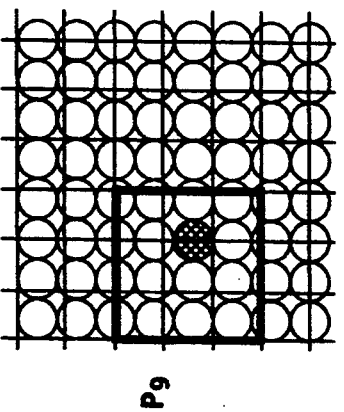
Figure 13M:
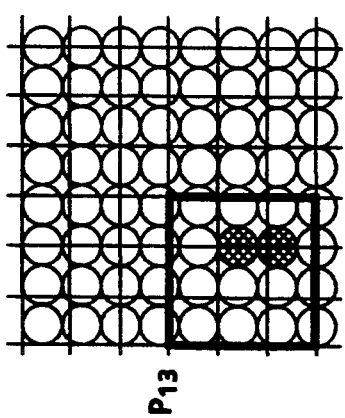

For further clarification, FIGS. 13A–13P depict the sixteen possible phase relationships, $P_1$–$P_{16}$ respectively, for the phases associated with a 4-to-5 resolution conversion. For example, such a conversion might be employed to convert a 480 spi bitmap for printing on a 600 spi digital printer commonly available today. In implementing such a conversion in hardware, as previously described, a series of sixteen look-up tables would be necessary to represent all possible phase relationships between the input and output bitmaps. In general, for an M to N non-integer resolution conversion $M^2$ phases will exist and must generate a total of $N^2$ pixels. The location of the output target pixels for each phase can be optimized in several ways. For example they may be optimized to simplify the video architecture or they may be optimized from a statistical or topological perspective to yield the best rendition of an ideal bitmap.

In an alternative method for achieving the M-to-N non-integer conversion within enhancement filter 14 of FIG. 1, a common-resolution interim image may be employed. Specifically, the conversion process can be considered to be first an integer conversion to the common resolution K that is the least common multiple of the input and output resolutions. For example, where M=480 spi and N=600 spi, the higher resolution K is 2400 spi. After the bitmap has been converted to 2400×2400 spi using template-based filters it can be integer subsampled to 600×600 spi. The integer subsampling could be performed as the image is generated, so that no extra memory is needed, or some part of it could be stored until needed. The template-based filter for the conversion from M to K, for instance 480×480 spi to 2400×2400 spi, may be designed in accordance with the teachings of copending application Ser. No. 08/169,487 for an "Image Resolution Conversion Method that Employs Statistically Generated Multiple Morphological Filters," or by the "Method for Design and Implementation of an Image Resolution Enhancement System that Employs Statistically Generated Look-Up Tables," Ser. No. 08/169,485, both by Loce et al., and both previously incorporated herein by reference.

Such an alternative conversion method includes both designing the statistic-based look-up tables to accomplish the M-to-K conversion and the alternative method of utilizing the M-to-K conversion tables in conjunction with subsampling hardware to also perform the non-integer resolution conversion. It is believed that this alternative, while requiring faster processing speeds and correspondingly faster hardware for generating the high resolution image (but not for subsampling it), would be advantageous due to the simplicity of the logic implementation. In particular, in a simple binary output embodiment, where pulse width and position modulation circuitry would not be needed, the integer to integer nature of the conversions would allow for much simpler clocking of the video data.

Also note that, as in copending application Ser. No. 08/169,565 for a "Method for Statistical Generation of Density Preserving Templates for Print Enhancement," by Loce, filed concurrently herewith and previously incorporated by reference, iterative techniques can be utilized to further improve the image enhancement achieved by the present invention.

In recapitulation, the present invention is a method and apparatus for converting the resolution of bitmap images, and more specifically, to the use of a template matching process to alter the resolution of digital images for printing or similar methods of rendition. The present invention uses statistically generated templates, implemented using look-up tables, to improve document appearance upon output by converting from an original or input spatial resolution to an output spatial resolution that is device dependent, where there is a non-integer relationship between the input and output resolutions. The resulting pixel image signals may then be utilized to control a scanning beam where the beam varies in intensity and duration according to the pulses used to control it.

It is, therefore, apparent that there has been provided, in accordance with the present invention, a method and apparatus for improving the appearance of printed documents. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. In a system suitable for depicting a bitmap image as a plurality of pixels, a method for converting an input bitmap having a first resolution into an output bitmap image having a second, reproducible resolution, wherein the second resolution is a non-integer multiple of the first resolution, said method comprising the steps of:
   (a) creating a plurality of look-up tables, wherein each look-up table represents a unique phase relationship between the first and second resolution bitmaps and where each look-up table entry represents the resulting output to be generated by the look-up table in response to a specific pattern of input pixels within a pixel observation window;
   (b) determining, as a function of the position of the pixel observation window, the phase relationship for an output pixel in the output bitmap; and
   (c) generating, in response to the phase relationship and the pattern of input pixels within the pixel observation window, a video signal for the output pixel, said output pixel being produced at the second, reproducible resolution of the system.

2. The method of claim 1, further comprising the step of repeating steps (b) and (c) recited therein for a new output pixel selected from the output bitmap, until video signals have been generated for all output pixels therein.

3. The method of claim 2, wherein said step of generating a video signal for the output pixel, comprises:
   (a) selecting, in response to the phase relationship, a look-up table to be used to determine a level of the video signal;
   (b) producing an index pointer as a function of states of the pixels within the pixel observation window; and
   (c) reading, using the index pointer as an address, a video signal level for the output pixel from a location within the look-up table selected in step (a).

4. A method for converting the resolution of a bitmap image having a first resolution, to enable production of a printed output on an electronic reprographic system capable of producing the printed output at a second resolution in response to a series of pulse-width, position-modulated signals, wherein the second resolution is a non-integer multiple of the first resolution, comprising the steps of:
   (a) selecting a target pixel location in the bitmap image;
   (b) observing a set of pixels within a pixel observation window superimposed on the bitmap image, relative to the target pixel location;
   (c) generating an index pointer as a function of a subset of the set of pixels;
   (d) determining, as a function of the position of the pixel observation window within the bitmap image, a phase of the pixel observation window; and
   (e) generating, as a function of the index pointer and the phase of the pixel observation window, an output pixel to be reproduced by the electronic reprographic system, said output pixel being produced at the second resolution.

5. The method of claim 4, wherein said step of generating an output pixel, comprises:

(a) selecting, in response to the phase of the pixel observation window, a look-up table to be used to determine a level of the output pixel; and (b) reading, using the index pointer as an address, a pulse-width, position modulated signal level for the output pixel from a location within the look-up table.

6. The method of claim 5, further comprising the step of determining, using the index pointer a code that defines the characteristics of the pulse-width, position modulated signal that will be used by the electronic reprographic system to print the target pixel.

7. The method of claim 4, further comprising the step of repeating each step for a plurality of pixels within the bitmap image.

8. The method of claim 4, wherein said step of observing a set of pixels within a pixel observation window, comprises:

(a) retrieving the binary signal level for each pixel of the bitmap image located within the pixel observation window; and (b) determining the binary states of a subset of pixels, wherein the subset of pixels is defined as a function of a predetermined morphological filter design.

9. The method of claim 8, wherein said step of generating an index pointer, comprises storing the binary signal level retrieved for each pixel in a predetermined bit position within an address register.

10. The method of claim 9, wherein said step of looking-up a code that defines the characteristics of the pulse-width, position modulated signal, comprises:

(a) applying the index pointer stored in the address register to an address bus so as to access a memory location corresponding to the index pointer; and (b) supplying the data value stored in the memory location to a pulse-width, position modulated marking engine so as to enhance the printed output.

11. The method of claim 10, further comprising the step of repeating each step for a plurality of pixels within the bitmap image.

12. The method of claim 6, wherein the code that defines the characteristics of the pulse-width, position modulated signal is determined using a conditional expectation, obtained from a training set of bitmaps.

13. A method for converting the resolution of a bitmap image having a first resolution, to enable production of a printed output on an electronic reprographic system capable of producing a second resolution image in response to a series of pulse-width, position-modulated signals, wherein the second resolution is a non-integer multiple of the first resolution, comprising the steps of:

(a) selecting a target pixel location in the bitmap image;

(b) observing a set of pixels within a pixel observation window superimposed on the bitmap image, relative to the target pixel location;

(c) generating an index pointer as a function of a subset of the set of pixels;

(d) determining, as a function of the position of the pixel observation window within the bitmap image, a phase of the pixel observation window;

(e) generating, as a function of the index pointer and the phase of the pixel observation window, an output pixel to be reproduced by the electronic reprographic system, including (i) selecting, in response to the phase of the pixel observation window, a look-up table to be used to determine a level of the output pixel;

(ii) reading, using the index pointer as an address, a code that defines a pulse-width, position modulated signal that will be used by the electronic reprographic system to print the target pixel, wherein the code that defines the characteristics of the pulse-width, position modulated signal is determined by a method including the steps of:

(1) choosing a set of training documents, wherein the training documents are generally representative of printed matter produced by the reprographic system;

(2) digitizing the training documents to produce both an input training bitmap, representing the training image at the original bit resolution, and an output training bitmap, representing the training image at the bit resolution of the electronic reprographic system;

(3) repeatedly extracting corresponding windowed sections of the input and output training bitmaps;

(4) analyzing the extracted windowed sections of the input and output training bitmaps so as to compile statistics about relationships between corresponding windowed sections of the input and output training bitmaps; and (5) determining the pulse-width, position-modulation code for each possible arrangement of input training pixels within the window, wherein an appropriate pulse-width, position-modulation code will be generated in response to an index pointer that represents a unique arrangement of input training pixels.

14. The method of claim 13, wherein the step of digitizing the training documents includes the step of scanning at least one of the training documents to produce digitized representations thereof at the original bit resolution and at the bit resolution of the electronic reprographic system.

15. The method of claim 13, wherein the training documents are electronically stored in a page description language, and where the step of digitizing the training documents includes the step of decomposing at least one of the training documents to produce digitized representations thereof at the original bit resolution and at the bit resolution of the electronic reprographic system.

16. The method of claim 13, wherein the step of analyzing the extracted windowed sections of the input and output training bitmaps, comprises recording, in a second memory, the number of occurrences of a given output training bitmap pattern for a particular pattern of pixels within an extracted window of pixels from the input training bitmap.

17. The method of claim 16, wherein the step of determining the pulse-width, position-modulation code, comprises:

(a) finding the most frequently occurring output training bitmap pattern for each possible arrangement of input training bitmap pixels; and (b) assigning the pulse-width, position modulation code required to produce the most frequently occurring output training bitmap pattern to a memory location within the look-up table.

18. A method for converting the resolution of a bitmap image having a first resolution (M), to enable production of a printed output on an electronic reprographic system capable of producing a second resolution (N) image in response to a series of pulse-width, position-modulated signals, wherein the second resolution is a non-integer multiple of the first resolution, comprising the steps of:

(a) selecting a target pixel location in the bitmap image;

(b) observing a set of pixels within a pixel observation window superimposed on the bitmap image, relative to the target pixel location;

(c) generating, as a function of the states of the set of pixels, a third bitmap image having a common resolution K, wherein K is a common multiple of M and N;

(d) subsampling the third bitmap image so as generate a series of second resolution pulse-width, position-modulated signals for output by the electronic reprographic system to produce the second resolution (N) image.

19. The method of claim 18, further including the step of storing at least a portion of the third bitmap image in an image memory prior to subsampling.

20. The method of claim 18, wherein the step of generating a third bitmap image comprises the steps of:

defining an index pointer as a function of a subset of the set of pixels; and generating, as a function of the index pointer, a plurality of output pixels at common resolution K.

21. An electronic printing apparatus capable of printing a bitmap image having a first resolution by producing a series of pulse-width, position-modulated signals at a second resolution wherein the second resolution is a non-integer multiple of the first resolution, comprising:

pixel selection means for selecting a target pixel location in the bitmap image;

image memory for recording the binary states of a set of pixels in the bitmap image located within a pixel observation window positioned relative to the target pixel location;

a pixel state register for storing an address generated as a function of the binary states of a subset of the pixels stored in said image memory;

phase control logic for determining a phase of the pixel observation window; and translating means, responsive to the value stored in said pixel state register and the phase of the pixel observation window, for outputting a pulse attribute word that defines the characteristics of the pulse-width, position modulated signal used to print the target pixel so as to enhance the resulting printed output.

22. The method of claim 21, wherein said translating means, comprises:

a plurality of look-up tables; and means for selecting, in response to the phase control logic, a look-up table from said plurality of look-up tables, so that the pulse attribute word for the target pixel can be read from a position within the selected look-up table using the address stored in the pixel state register.

23. The apparatus of claim 21, wherein said translating means, comprises:

a plurality of look-up tables formed from a plurality of contiguous memory locations;

an address bus suitable for selecting, as a function of an address presented thereon, a location within one of said look-up tables; and a data bus, connected to said look-up tables, to enable a value stored within the addressed location to be output to a marking engine to control the generation of the pulse-width, position modulated signal.

24. An electronic printing apparatus capable of printing a bitmap image having a first resolution by producing a series of pulse-width, position-modulated signals at a second resolution wherein the second resolution is a non-integer multiple of the first resolution, comprising:

pixel selection means for selecting a target pixel location in the bitmap image;

image memory for recording the binary states of a set of pixels in the bitmap image located within a pixel observation window positioned relative to the target pixel location;

a pixel state register for storing an address generated as a function of the binary states of a subset of the pixels stored in said image memory;

phase control logic for determining a phase of the pixel observation window;

translating means, responsive to the value stored in said pixel state register and the phase of the pixel observation window, for outputting a pulse attribute word that defines the characteristics of the pulse-width, position modulated signal used to print the target pixel so as to enhance the resulting printed output, wherein the pulse attribute word output by said translating means includes information for controlling the formation of a corresponding pulse during a clock period;

means for splitting a series of pulse attribute words into two channels;

means corresponding to each channel for accepting pulse attribute words from respective channels, and forming pulses using the information included in the pulse attribute words to control the formation of the pulses;

means for generating the pulses, wherein a pulse from a first pulse forming means is generated while a pulse from a second pulse forming means is being formed; and a pulse inverter for selectively inverting a pulse generated during a clock period to produce a pair of complimentary pulses within the selected period.

25. The apparatus of claim 24, wherein said translating means includes means for translating the value stored in said pixel state register into first and second series of pulse attribute words, the first series of pulse attribute words corresponding to formation of a leading edge of each pulse, and the second series of pulse attribute words corresponding to formation of a trailing edge of each pulse.

26. The apparatus of claim 25, wherein each pulse attribute word corresponding to formation of a leading edge of a pulse contains information for a delay, measured from the beginning of a pixel period to the leading edge of the pulse, and each pulse attribute word corresponding to the formation of a trailing edge of a pulse contains information for a delay, measured from the beginning of a pixel period to the trailing edge of the pulse, and wherein the information for the delay to the leading edge of the pulse and the information for the delay to the trailing edge of the pulse are independently variable.

27. The apparatus of claim 26, wherein each pulse attribute word contains information for use by said pulse inverter so as to enable the selective inversion of a pulse produced in response to an attribute word.

* * * * *